US000001134H

United States Statutory Invention Registration [19]

[11] Reg. Number: H1134

Meadows et al.

[43] Published: Feb. 2, 1993

[54] AIRCRAFT FIRE-FIGHTING TRAINING APPARATUS

[75] Inventors: Donald H. Meadows, Kintnersville; Vincent J. Crusco, Hatboro, both of Pa.

[73] Assignee: The United States of America as represented by the Secretary of the Navy, Washington, D.C.

[21] Appl. No.: 760,778

[22] Filed: Sep. 11, 1991

[51] Int. Cl.[5] ..... G09B 9/00

[52] U.S. Cl. ..... 434/226

[58] Field of Search ..... 244/1 R, 129.2; 169/62, 169/54, 91, 43; 434/226

[56] References Cited

U.S. PATENT DOCUMENTS

| | | | |
|---|---|---|---|
| 4,526,548 | 7/1985 | Livingston | 434/226 |
| 4,983,124 | 1/1991 | Ernst et al. | 434/226 |
| 5,052,933 | 10/1991 | Rogers et al. | 434/226 |
| 5,055,050 | 10/1991 | Rogers et al. | 434/226 |

FOREIGN PATENT DOCUMENTS

| | | | |
|---|---|---|---|
| 2310602 | 5/1976 | France | 434/226 |

*Primary Examiner*—Michael J. Carone
*Attorney, Agent, or Firm*—James V. Tura; James B. Bechtel; Susan E. Verona

[57] ABSTRACT

An aircraft fire-fighting training apparatus is disclosed that allows firefighters to train on a mock-up that simulates a real-life aircraft fire but yet is controllable and environmentally safe. A fuel source feeds liquid propane through several discrete shut-off valves to sets of primary and secondary nozzles where it is ignited. A deflector shield placed adjacent the primary nozzles forces the flames into a channel adjacent the mock-up, causing a rolling flame to engulf all of the fuselage of the mock-up. Secodary nozzles provide flame to simulated landing gear attached to the mock-up wings.

13 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

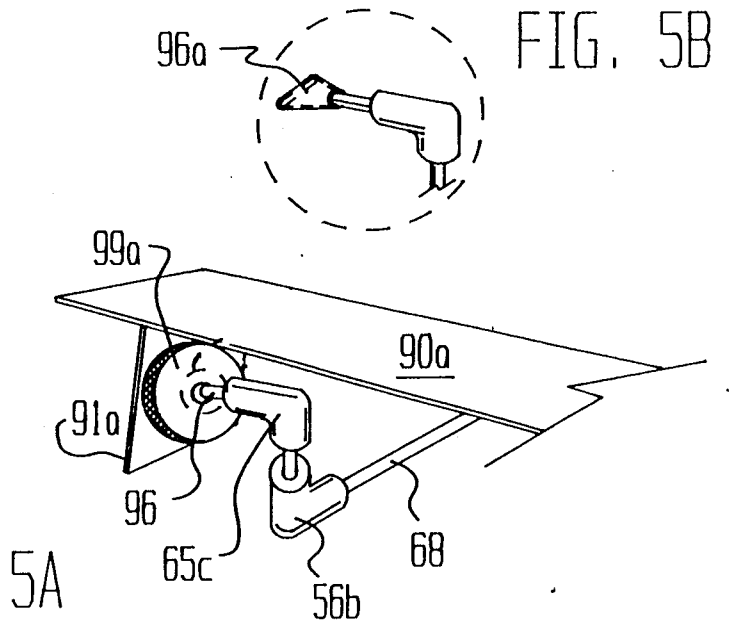
FIG. 5B
FIG. 5A
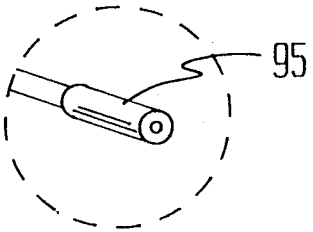
FIG. 4B
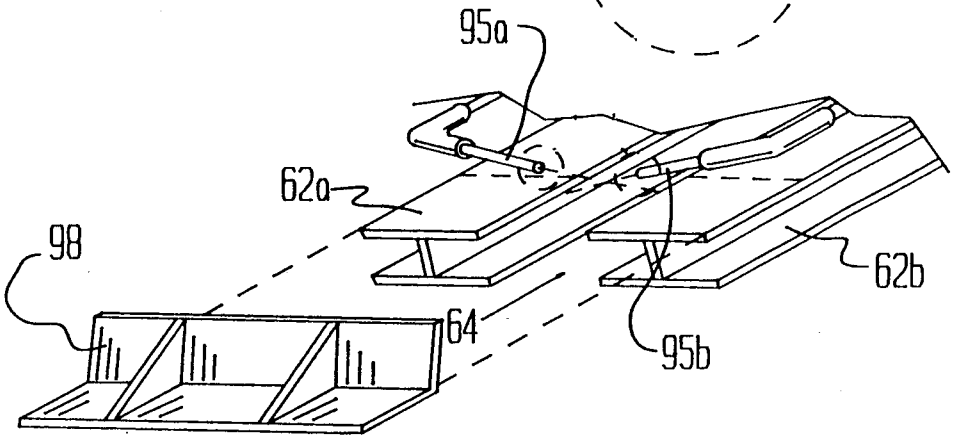
FIG. 4A

AIRCRAFT FIRE-FIGHTING TRAINING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The instant invention is concerned with providing realistic training to fire-fighters who must deal with aircraft fires on the ground. More particularly, the instant invention provides a training apparatus that, while on the one hand is realistic in the type and severity of the fire it can simulate, on the other hand has numerous safety controls designed into it and is cost-efficient and environmentally safe to use.

In order for fire crews at airports, military airfields and such other installations to quickly and safely handle aircraft fires, a proper amount of "hands-on" training must be provided. A traditional approach that is known is to pour a quantity of aviation fuel over and around a burned out hull and start a fire. Aside from the real-life experience this training provided, it always carried with it a number of imprudent sidelines. For one thing, there was always a danger factor involved not only to the area but to training personnel, when spilling JP-4, or some other fuel, over and around a structure and then setting it on fire. The ground area all around the spill, as well as the structure itself, would go up in flames and the only way to stop the burning would be to suffocate the fire, wherever it was and for however long it took. Depending on the spill, this could be time-consuming. Certainly the training area would be removed from the main activity of the airfield to lessen this danger, but there still remained the fact that the burning had to continue until either the fire was completely extinguished, possibly leaving unburned fuel around, or all of the fuel was entirely burned up.

Another danger with the traditional approach is the one to the environment. Burning JP-4 causes thick black clouds of smoke or air-borne pollutants. Unburned JP-4 could contaminate the ground water in the local vicinity. Neither of these two results are desirable, and in fact, could cause environmental damage.

SUMMARY OF THE INVENTION

Accordingly, it is an object of the present invention to provide a fire-fighting training apparatus that gives a close to real-life aircraft fire for training purposes.

It is a further object of the present invention to provide a training apparatus that gives a close to real-life aircraft fire that can be safely controlled and quickly and efficiently terminated on demand.

It is a still further object of the present invention to provide a fire-fighting training apparatus that gives a close to real-life aircraft fire for training purposes that does not introduce harmful pollutants into the environment.

These and other objects and many attendant advantages of the present invention are obtained where an aircraft mock-up is provided comprised of a tubular structure with wings extending from either side and vents at predetermined locations therein and has a plurality of flame producing nozzles adjacent precise locations therein. A fuel storage tank spaced apart therefrom provides liquid propane through a series of cut-off valves and fuel-lines leading to the nozzles. The mock-up rests upon a flame guiding channel and deflectors at each nozzle direct the flame to predetermined sections of the mock-up.

The novel features which are believed to be characteristics of the invention, both as to its organization and method of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE DRAWINGS

FIG. 4 shows an isolated perspective view of the primary nozzles taken at an end of the mock-up of FIG. 1; and FIG. 5 shows an isolated perspective view of one of the secondary nozzles taken at the side of the mock-up of FIG. 2.

DETAILED DESCRIPTION OF THE PREFERRED EMBODIMENT

Figure 1:
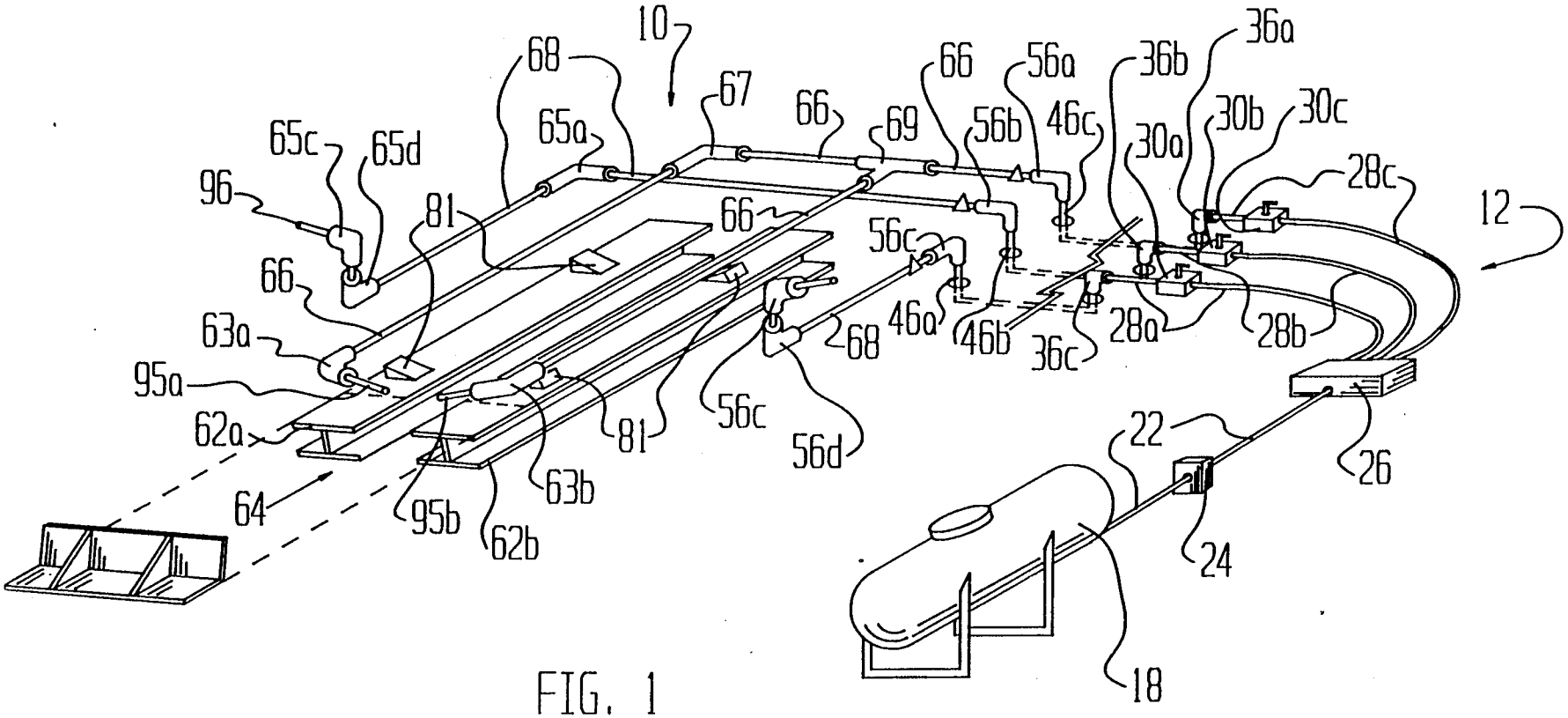
FIG. 1 shows a perspective view of the lower half of the fire-fighting training apparatus connected to the fuel source.
Figure 2:
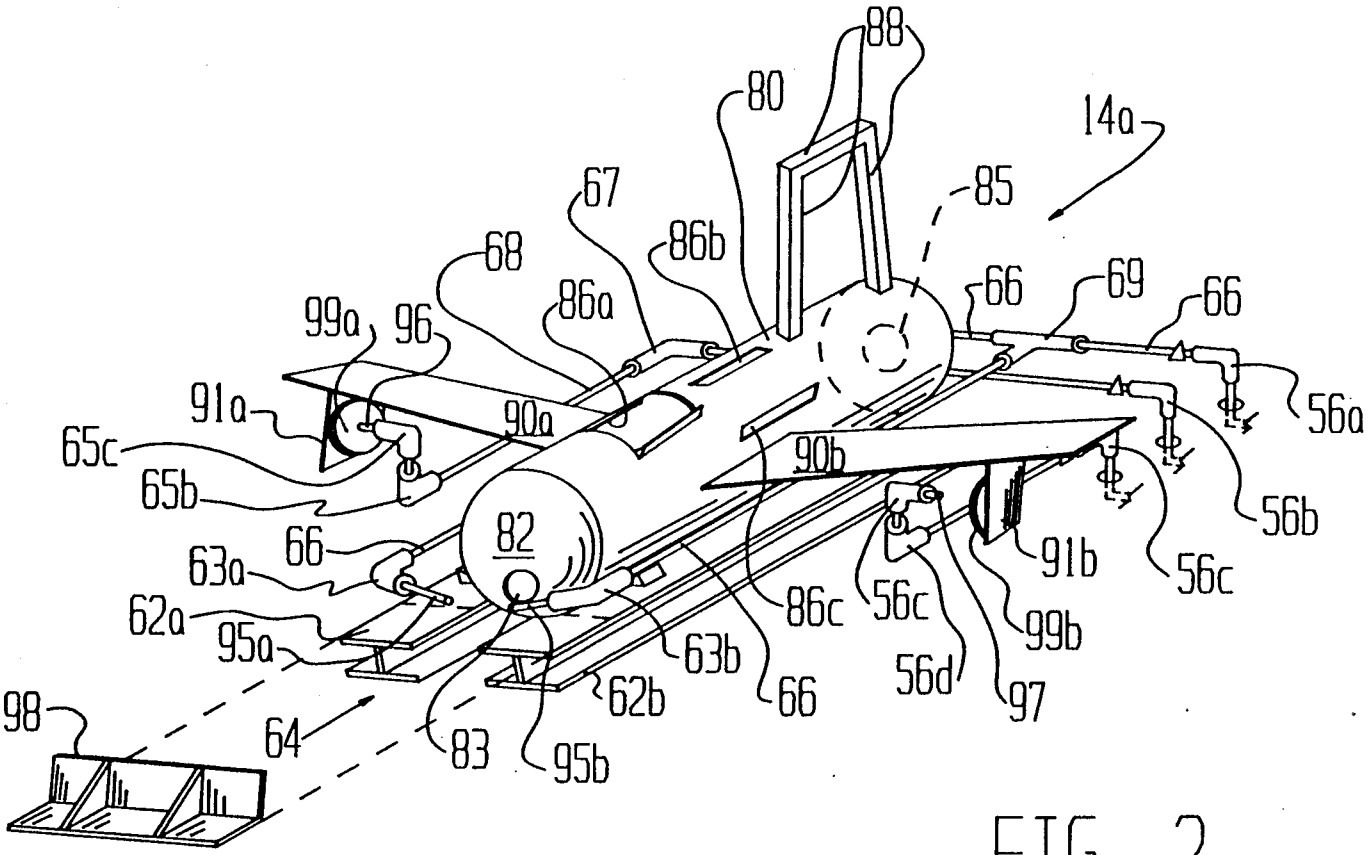
FIG. 2 shows a perspective view of an aircraft mock-up on top of the lower half of the apparatus.

Referring now to the drawings, wherein like reference characters designate like or corresponding parts throughout the several views, there is illustrated in FIG. 1 a perspective view of the lower portion 10 and fuel supply system 12 of a fire fighting training apparatus and in FIG. 2 a perspective view of an aircraft mock-up 14*a* set on top of said lower portion 10. The training apparatus can be placed on any convenient concrete or asphalt surface. As shown more clearly in FIG. 1, fuel supply system 12 is comprised of a fuel storage tank 18, a main fuelpipe 22 with a control and shut-off valve 24 connected thereto, a standard, multi-port diverter and splitter valve 26, individual feeder lines 28*a, b* and *c* and individual control valves 30*a, b* and *c*, all as will be more fully described below. FIG. 1 also shows the lower portion 10 of the apparatus, prominently displaying individual fuel pipes 66 and 68 and the parallel and spaced-apart I-beams 62*a* and *b* that provide support for mock-up 14*a* and that form a fire-flow channel 64 underneath mock-up 14*a* by elevating mock-up 14*a* a predetermined distance above ground level. The physical distance between I-beams 62*a* and *b* and tank 18 is sufficient to guarantee the safety of an operator at valve 24 or valves 30*a, b* and *c* and to place the quantity of fuel stored in tank 18 completely out of range of heat or flame. Pipes 66 and 68 form one configuration for a fire producing means by providing a transfer means from elbow connectors 56*a, b* and *c*. For the sake of convenience, the connecting fuelpipes 46*a, b* and *c* are shown discontinued from where they extend from elbow connectors 36*a, b* and *c*, respectively. In the preferred embodiment, pipes 46*a, b* and *c*, 66, and 68 can be ¾ inch black iron pipe and the elbow connectors 36*a, b* and *c*, 56*a, b, c, d* and *e*, 63*a* and *b*, 65*a, b* and *c* and 67 and the "T"-connector 69 can be standard iron fittings, or other suitable materials as known in the trade.

Figure 3A:
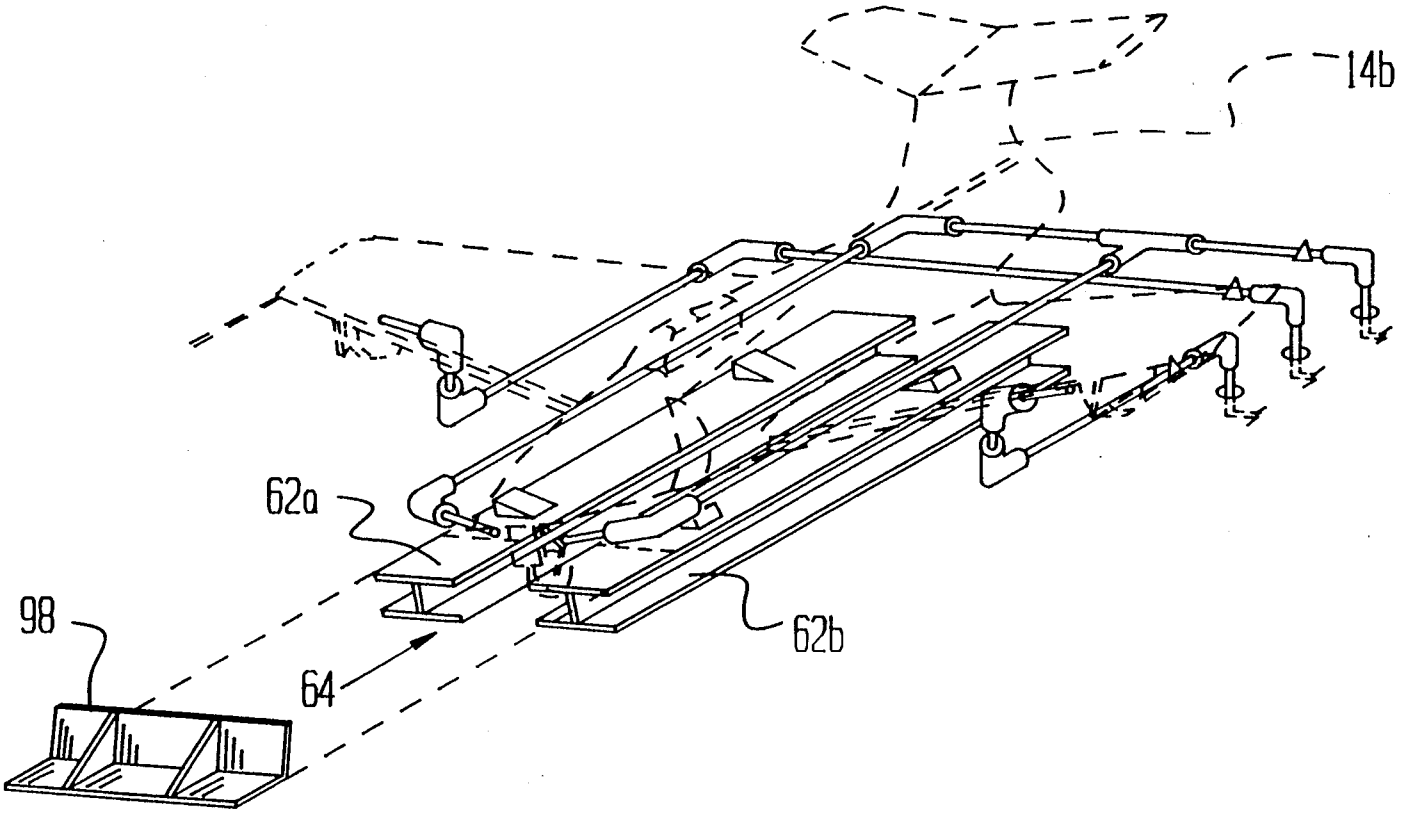
FIGS. 3*a* and 3*b* show views similar to FIG. 2 but with a different styles of aircraft mock-ups (in phantom)
Figure 3B:
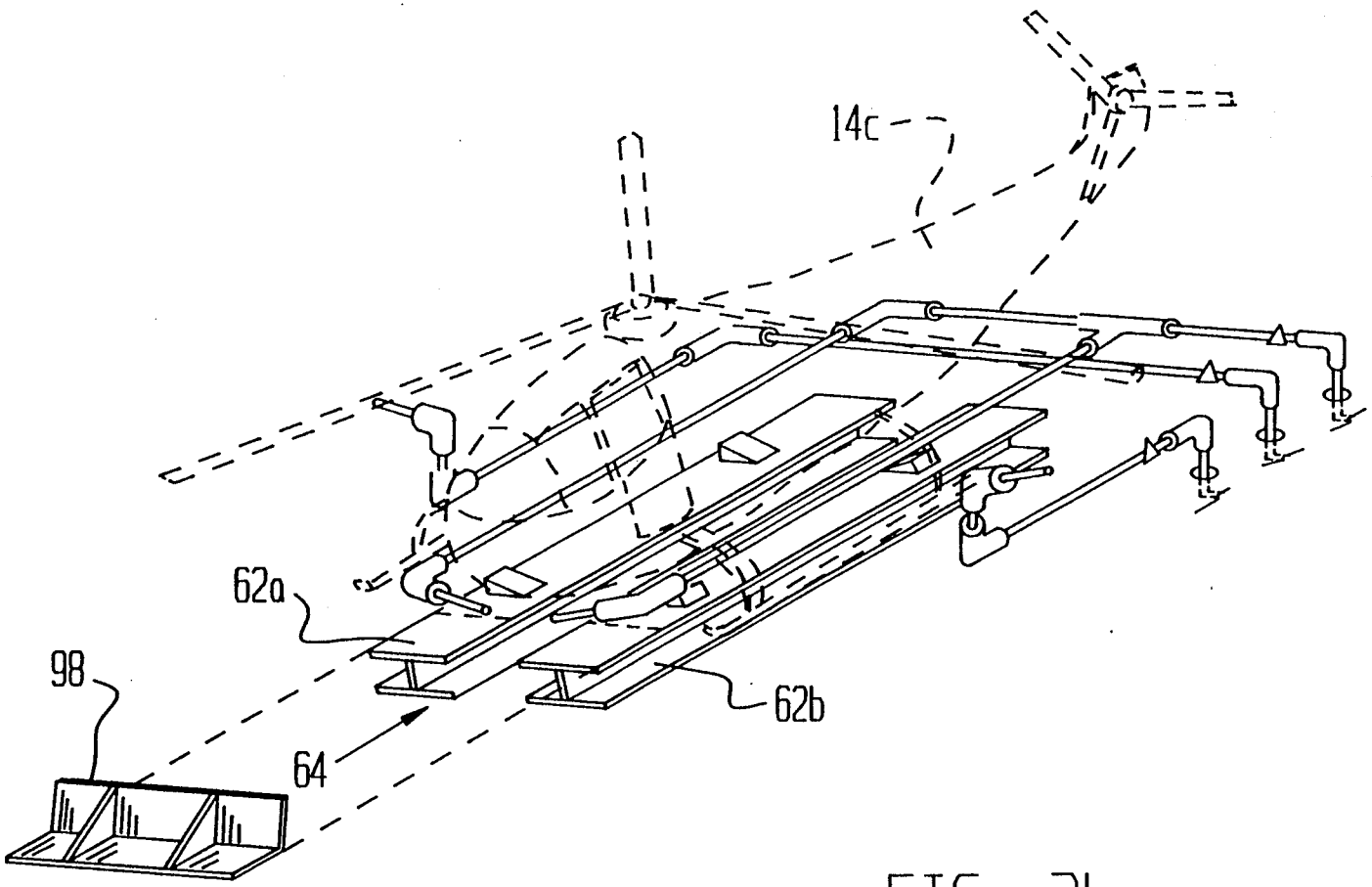

FIG. 2 shows the preferred embodiment for using an aircraft mock-up 14*a*. FIGS. 3*a* and 3*b* give alternate embodiments (14*b* and 14*c*, as shown in phantom) that may be used depending on the training scenario. Mock-up 14*a* has generally a tubular shape with each end, forward 82 and aft 84, being flat cylinders with each having a small aperture, 83 and 85 respectively, cut therein. It has been found that three 550 gallon drums welded together, with the interior, adjacent ends removed, provide a large enough body 80 for the mock-up. Aside from the holes cut into either end, body 80 can also have several vents cut therein, for a purpose to be explained, as at cockpit vent 86*a* and side vents 86*b* and *c*. Body 80 has a vertically extending rudder 88, comprised of appropriately-sized steel beams, attached to the upper surface near the aft end and a pair of horizontally-extending wings 90*a* and *b* attached at oppositely-disposed places on the sides thereof. Each wing can be made of an appropriately-sized flat steel sheet and each has a downwardly-extending projection 91*a* and *b* attached thereto to simulate the approximate size of an aircraft landing gear. Body 80 is fixedly attached to wedges 81, seen more clearly in FIG. 1, which, in turn, are fixedly attached to predetermined places on the upper surface of I-beams 62.

As seen in FIG. 2, and in the isolated and enlarged views of FIGS. 4 and 5, fuel-emitting nozzles 95*a* and *b*, 96 and 97 are located at the front end of mock-up 14*a* and adjacent each projection 91*a* and *b* from the wings. Nozzles 95, 96 and 97 can be of reducer-type, such as is shown by the enlarged, isolated view in FIG. 4, or the fan-type, such as is shown by the enlarged, isolated view in FIG. 5. To ensure that the flames from a nozzle are properly controlled, deflector shields 98 (shown spaced apart from its location atop the ends of I-beams 62) and 99*a* and *b* are placed a predetermined distance adjacent each nozzle. Shields 99*a* and *b* can be in the shape of disks attached to vertical projections 91*a* and *b*, respectively, and shield 98 is meant to be a generally rectangular plane extending in a vertical posture from a suitable base adjacent nozzles 95. As seen in FIGS. 2 and 4, nozzles 95 at the front end are angled down from the horizontal by about 45 degrees.

OPERATION

The main purpose of the training apparatus is to provide firefighters realistic training in combatting aircraft fires. The actual configuration of the aircraft mock-up is designed to simulate an actual aircraft and the fuel used and the means of delivering it to the mock-up and the means of producing the fire become important factors in making the training apparatus successful. The fuel selected was liquid propane, not only for its environmental characteristics, but also for its availibility and storage and handling characteristics. Liquid propane burns with a relatively clean flame when compared to burning JP-4 or JP-5, standard aviation fuels used in the prior art, and is much more available and cost-effective than other fuels, such as butane or the like. Burning liquid propane gives the heat and flame distribution desired, a condition as near as possible to an actual aircraft fire, and in the storage tank 18, pressures on the liquid at the bottom of the tank (approximately 350 psi), caused by the natural evaporation of the fuel, force the liquid into and through the fuelpipes.

When a training scenario is desired, say for example with just the body of mock-up 14*a*, shield 98 is correctly positioned adjacent nozzles 95 and all valves are checked to be in the off position. Some form of ignition means, such as a flare, is set between nozzles 95 and then lighted. Valve 24, which could be a ball-type valve, is first opened allowing the propane to flow through fuelpipe 22, diverter 26 and feed lines 28*a, b* and *c*. In this scenario, only feederline valve 30*c*, which could be a gate-type valve, would be opened, allowing the fuel to flow through line 46*c* to line 66 and finally to nozzles 95*a* and *b*. With either of the two previously mentioned nozzle tips, the resulting fire can be formed as a deep, continuous fire, where vent openings 86*a, b* and *c* allow flames to shoot out of various sections of mock-up, or it can be formed as a large flame in essentially one location.

Finally, while the fire training apparatus has been described with reference to a particular embodiment, it should be understood that the embodiment is merely illustrative as there are numerous variations and modifications which may be made by those skilled in the art. Thus, the invention is to be limited only by the spirit and scope of the appended claims.

What is claimed is:

1. A fire-fighting training apparatus, comprising:

a. a vehicle mock-up having a front and a back end with a plurality of vents therein;

b. fuel storage means spaced apart from said mock-up;

c. fire production means located at said vehicle mockup; and d. fuel supply means leading from said fuel storage means to said fire production means.

2. A fire-fighting training apparatus as described in claim 1 wherein said fire production means includes at least one fuel-emitting nozzle.

3. A fire-fighting training apparatus as described in claim 1 wherein said vehicle mock-up comprises a tubular body.

4. A fire-fighting training apparatus as described in claim 1 wherein said fire production means includes a plurality of flame emitting nozzles having ignition means and deflector means adjacent thereto.

5. A fire-fighting training apparatus as described in claim 4 wherein said fire-production means comprises at least one flame channel leading from the front end to the back end of said mock-up.

6. A fire-fighting training apparatus as described in claim 1 wherein said fuel supply means comprises a fuelpipe to carry fuel to said fire production means and a shut-off valve thereon.

7. A fire-fighting training apparatus as described in claim 6 wherein said fuel supply means includes a tank of liquified natural gas.

8. A fire-fighting training apparatus as described in claim 6 wherein splitter means is attached to said fuelpipe to divert the fuel into a plurality of individual and unique mock-up fuelpipes.

9. A fire-fighting training apparatus as described in claim 3 wherein said mock-up also includes a pair of laterally-extending wings from oppositely-disposed areas on said tubular body with each said wing having a projection therefrom.

10. A fire-fighting training apparatus as described in claim 9 wherein said fuel supply means includes a fuelpipe and a shutoff valve and splitter means connected to said fuelpipe to divert fuel into discrete mock-up fuelpipes leading to an end and each of said pair of wings.

11. A fire-fighting training apparatus as described in claim 4 wherein each said nozzle is connected to a fan nipple.

12. A fire-fighting training apparatus as described in claim 4 wherein each said nozzle is connected to a reducer nipple.

13. A fire-fighting training apparatus comprising:

a. a tubular body having a front and a back end with vents cut therein at predetermined locations and a pair of laterally-extending wings extending from oppositely-disposed areas thereon, with each said wing having a projection therefrom;

b. a channel extending along and adjacent to said tubular body from the front to the back at the lower surface thereof;

c. a tank of liquified natural gas;

d. a plurality of fuel-emitting nozzles located at the front end and adjacent each said projection; and e. a fuelpipe having a valve connected thereto leading from said tank to said nozzles.

* * * * *